United States Patent [19]

Floyd et al.

[11] Patent Number: 5,346,948
[45] Date of Patent: Sep. 13, 1994

[54] ODOR FREE, AIR DRY, DECORATIVE LATEX PAINTS

[75] Inventors: F. Louis Floyd, Strongsville; Gary P. Craun, Berea, both of Ohio

[73] Assignee: The Glidden Company, Cleveland, Ohio

[21] Appl. No.: 115,109

[22] Filed: Sep. 2, 1993

Related U.S. Application Data

[63] Continuation-in-part of Ser. No. 19,633, Feb. 18, 1993, Pat. No. 5,326,808.

[51] Int. Cl.$^5$ .............................................. C08K 5/09
[52] U.S. Cl. .................................... 524/773; 524/563; 524/564; 524/774; 524/794; 524/832
[58] Field of Search ............... 524/773, 794, 774, 832, 524/563, 564

[56] References Cited

U.S. PATENT DOCUMENTS

| | | | |
|---|---|---|---|
| 4,087,396 | 5/1978 | Hudecek et al. | 524/773 |
| 4,113,687 | 9/1978 | Ugelstad | 524/794 |
| 4,336,173 | 6/1982 | Ugelstad | 524/794 X |
| 5,169,891 | 12/1992 | Brown | 524/563 X |

*Primary Examiner*—Judy M. Reddick
*Attorney, Agent, or Firm*—Thomas M. Schmitz

[57] ABSTRACT

An aqueous ambient dry paint coating based on vinyl acetate matrix polymer containing a chlorinated hydrocarbon modifier selected from a chlorinated hydrocarbon having a Tg below $-20°$ C. and a number average molecular weight between 150 and 5,000, where the coating is free of organic coalescing solvents as well as other volatile organic compounds (VOC). The matrix polymer is produced by mixing the chlorinated modifier with the vinyl acetate monomer and other ethylenic monomers, if any, to form an organic mixture, providing an aqueous micro dispersion of the organic mixture phase having droplet size less than 5 microns, and copolymerizing the monomer to produce a polymeric binder of vinyl acetate polymer containing chlorinated modifier, where the polymeric binder system and coating is free of coalescing organic solvent.

16 Claims, No Drawings

ODOR FREE, AIR DRY, DECORATIVE LATEX PAINTS

This application is a continuation in part of copending application Ser. No. 019,633, filed Feb. 18, 1993, now U.S. Pat. No. 5,326,808.

This invention pertains to air dry emulsion paints based on emulsion polymeric binders and more particularly to odor-free, consumer latex paints free of polluting offensive odoriferous coalescing solvents.

BACKGROUND OF THE INVENTION

Paint coatings are surface protective coatings applied to substrates, dried to form continuous films for decorative purposes as well as to protect the substrate. Consumer paint coatings are air-drying aqueous coatings applied primarily to architectural interior or exterior surfaces, where the coatings are sufficiently fluid to flow out, form a continuous paint film, and dry at ambient temperatures to protect the substrate surface. A paint coating ordinarily comprises an organic polymeric binder, pigments, and various paint additives. In dried paint films, the polymeric binder functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in a dispersant medium, and thinning to commercial standards.

Latex paints for the consumer market ordinarily are based on polymeric binders prepared by emulsion polymerization of ethylenic monomers. A typical consumer latex paint binder contains a vinyl acetate copolymer consisting of polymerized vinyl acetate (80%) and butyl acrylate (20%). The hardness of the latex polymer must be balanced to permit air drying and film formation at ambient temperatures, which requires soft polymer units, while at the same time the polymer must be hard enough in the final dry film to provide resistance properties which requires hard polymer units. This is conventionally accomplished by designing a latex polymer with a moderately elevated Tg (glass transition temperature) but then lowering the Tg temporarily with a volatile coalescing solvent. Coalescing solvents function to externally and temporarily plasticize the latex polymer for time sufficient to develop film formation, but then diffuse out of the coalesced film after film formation, which permits film formation and subsequent development of the desired film hardness by the volatilization of the coalescent. Internal plasticization is based on coreaction of soft monomers with hard monomers to form a polymeric copolymer binder, such as 80/20 vinyl acetate/butyl acrylate, to obtain the desired film forming characteristics. If a lower Tg copolymer is used without a coalescing solvent, higher levels of soft comonomer are required leading to lower Tg polymer, and, hence, the final dried film would be undesirably soft, excessively tacky, readily stain, and readily pick up dirt.

A significant source of residual odor in latex consumer paints is directly due to the coalescing solvent. Coalescing solvents are typically linear (or slightly branched) glycol ethers and esters of 7 to 12 carbon atoms in length, which have boiling points typically above 200° C., and solubility parameters appropriate for the latex of interest. One typical coalescing solvent ordinarily contained in commercial latex paints is 2,2,4-trimethylpentanediol monoisobutyrate (Texanol-Eastman Chemical Co.). However, the odor associated with the gradual volatilization of this solvent is considered objectionable by consumers. Quite often the odor lingers for days or weeks after the paint is applied and dried. All useful coalescing solvents are volatile and have similar objectionable characteristics. An additional deficiency in conventional exterior latex paints is the decline in crack resistance of the dried paint film approximately proportional to the evaporation of the coalescing solvent. While better coalescing solvents have a retention time of about one year in dried paint films, cracking nevertheless starts to progressively appear after one year in the dried paint films. Hence, the elimination of coalescing solvents and attendant objectionable odors, along with air pollution caused by volatile organic compounds (VOC), and film cracking deficiencies represent both a technical and marketing advance in the state of the art of consumer latex paints.

In polymer technologies unrelated to air-dry vinyl acetate latex paints, preformed polymers have been dispersed into monomers and emulsified in water, whereupon the monomers are then polymerized, such as disclosed in U.S. Pat. No. 4,373,054 pertaining to cathodic electrocoating, or in U.S. Pat. No. 4,313,073 pertaining to alkyd prepolymers; U.S. Pat. No. 4,588,757 pertaining to laminating adhesives, or in U.S. Pat. No. 3,953,386 and U.S. Pat. No. 4,011,388 pertaining to aqueous emulsion blends containing cellulosic ester/acrylic polymers.

It now has been found that certain non-volatile softening chlorinated hydrocarbon modifiers compatible with a polyvinyl acetate matrix polymeric binder in a consumer latex paint can be retained in the dried paint film permanently. Softening chlorinated modifiers of this invention can be incorporated into the paint where the chlorinated modifier will be retained permanently in the final paint film. Hence, the paint will not generate an odor while drying nor emit a residual odor from the dried paint film or otherwise emit VOC's. The softening chlorinated modifiers of this invention externally plasticize the polyvinyl acetate and are not coreacted with the polyvinyl acetate polymeric binder. The softening chlorinated modifiers appear to function by a chain-spacing mechanism to soften the polyvinyl acetate polymers whereby the chlorinated modifiers provide low temperature film formation and tack-free films less prone to soiling at a given hardness and/or flexibility than ordinarily possible. A further advantage of this invention enable the use of essentially all hard polymer units of polyvinyl acetate without the need for internal plasticization (coreaction) with soft butyl acrylate polymeric units.

The present invention is based on a softening chlorinated hydrocarbon modifiers having a molecular weight range where the chlorinated modifiers will not subsequently diffuse out of the matrix polyvinyl acetate polymer when properly dispersed into the polymeric binder phase. Preferred chlorinated modifiers are nonvolatile hydrocarbons having a molecular weight between about 150–5,000 where 300–1,000 is preferred. Lower molecular weight compounds tend to be volatile and cause excessive migration while higher molecular weight compounds lose low temperature film-forming and softening effects. According to the process of this invention, a compatible organic solution of chlorinated hydrocarbon modifier in ethylenic monomer is dispersed into water and subjected to high energy shear to prepare a sub-micron size organic phase dispersion in water. Subsequent polymerization of the micronized monomer droplets produces a softened modified latex very different from conventional emulsion or suspension polymerization polymers. The micro suspension polymerization is generally necessary with the chlorinated modifiers to accomplish the required sub-micron aqueous emulsification of the monomer containing the dissolved chlorinated modifiers, since the chlorinated modifiers will not readily diffuse during polymerization from particle to particle across the aqueous phase.

The principal advantage of this invention is the elimination of the odor and VOC associated with volatile coalescent solvents which are intentionally volatile and intended to migrate out of the dried paint film. An additional advantage pertains to dried paint films exhibiting superior toughness obtained through the use of a hard polyvinyl acetate matrix polymer balanced with the chlorinated modifier to accommodate softening through the external addition of softening modifier while retaining the desired dried film hardness. A further advantage pertains to lower net cost for both interior and exterior paints since high cost soft monomers can be avoided, volatile coalescing agents can be eliminated, volatile organic solvents can be eliminated, and binder volume can be increased by using a permanent non-volatile softening chlorinated hydrocarbon modifier instead of a volatile coalescent. The resulting dried paint films exhibit a superior balance of hardness and flexibility while maintaining long term flexibility. These and other advantages of this invention will become more apparent by referring to the detailed description and illustrative examples.

SUMMARY OF THE INVENTION

Briefly, the air-dry emulsion paint of this invention contains a chlorinated hydrocarbon modified binder of polymerized ethylenic monomers preferably comprising a polyvinyl acetate polymeric binder externally modified with a non-reactive, low molecular weight, compatible chlorinated modifier selected from a chlorinated paraffin or a chlorinated fatty acid, or a chlorinated fatty acid ester, where between above 1% and desirably between 3% and 50% by weight of the softening chlorinated modifier is added to the polyvinyl acetate polymeric binder. In accordance with the process of this invention, the low molecular weight softening chlorinated hydrocarbon modifier has a preferred number average molecular weight between 150 and 5,000 and is effectively dissolved in vinyl acetate monomer to form a compatible organic solution before forming the polyvinyl acetate matrix polymer. The organic solution is dispersed into water by high shear, whereupon the vinyl acetate monomer is polymerized to produce a stabilized latex containing the chlorinated modifier.

DETAILED DESCRIPTION OF THE INVENTION

The air-dry emulsion paint of this invention comprises an emulsion polymer comprising a polyvinyl acetate polymeric binder containing a non-volatile chlorinated hydrocarbon modifier. Suitable chlorinated modifiers in accordance with this invention comprise chlorinated hydrocarbons consisting of chlorinated paraffins, chlorinated fatty acids, and chlorinated fatty acid esters. The foregoing softening chlorinated modifiers function as effective external modifiers for latex emulsion paints, and particularly for polyvinylacetate binder latex paints.

Useful non-volatile chlorinated modifiers have a number average molecular weight range between about 150 and 5,000, preferably between 200 and 3,000 and most preferably between 300 and 1,000. Useful chlorinated modifiers have low Tg's to sufficiently impart a plasticizing effect on the matrix polyvinyl acetate polymer. Useful Tg's of the chlorinated modifier measured by Differential Scanning Calorimetry (DSC) at 10° C./minute scan rate are less than −20° C., preferably less than −40° C. and most preferably below −50° C. The level of chlorinated modifier needed can vary considerably in the final latex. The level required depends on the inherent softening efficiency of the chlorinated hydrocarbon modifier (estimated by its Tg) and the Tg of the matrix (parent) polymer. The Fox equation is useful for estimating the level needed:

$$1/T_g \text{ (mix)} = (W_p/T_{g,p}) + (W_m/T_{g,m})$$

where $T_g$ (mix) = glass transition temperature of the modified polymer (which is a mixture);

$W_p$, $W_m$ = weight fraction of the parent (matrix) polymer and chlorinated modifier, respectively;

$T_{g,p}; T_{g,m}$ = glass transition temperature of the parent (matrix) polymer and the chlorinated modifier, respectively.

Thus, the level of chlorinated modifier required is directly related to the Tg of the parent polymer, and inversely related to the Tg of the chlorinated modifier. Hence, a lower modifier Tg will more efficiently soften the polyvinyl acetate matrix polymer provided the chlorinated modifier and matrix polymer are compatible. Compatibility of a polymeric mixture is commonly said to exist when the mixture remains substantially optically clear, which indicates the two components are mutually soluble. In this invention, compatibility is intended to mean that the chlorinated modifier is soluble in the matrix polymer in the solid state. Complete compatibility in the solid state is believed to exist when these conditions are met: the mixture has a Tg (DSC, DMA) intermediate between the Tg's of the two components; the absence of component Tg transition; the mixture Tg is smoothly dependent on level of modifier; and the mixture Tg follows a mixing rule such as the Fox equation. Tg's of mixtures depend on the Tg's of the two components, concentrations of the two components, and compatibility of the two components. The present invention pertains to substantially compatible components.

Suitable chlorinated hydrocarbon modifiers useful as external plasticizers in accordance with this invention include chlorinated hydrocarbon materials selected from chlorinated paraffins, chlorinated fatty acids, and chlorinated fatty acid esters. Useful molecular weights of the chlorinated materials range from about 150 to about 5,000, and chlorine contents can range from about 5% to 70% by weight. Industrially produced chlorinated materials generally are not pure compounds, but comprise a mixture of compounds with chlorine atoms substituted at various positions on the paraffin or fatty acid chain. Chlorinated paraffins for instance are chlorinated hydrocarbons having a chlorine content between about 20% and 70% by weight and preferably between 30% and 50% by weight. Chlorinated paraffins ordinarily are miscible with organic solvent including liquid ethylenic monomers, but are insoluble in water and hence will not migrate into polymer particles if added to the aqueous phase of a latex. Chlorinated fatty acids comprise chlorinated unsaturated fatty acid such as lauroleic, myristoleic, palmitoleic, oleic, recinoleic, linoleic, linolenic, eleostearic, liconic, and similar fatty acid derived from linseed oil, tung oil, oiticica oil, perilla oil, dehydrated castor oil, tall oil, soybean oil, and safflower oil, and similar unsaturated vegetable oils. Chlorinated fatty acid esters are chlorinated fatty acids esterified with low molecular weight alcohols. In accordance with the process of this invention, the chlorinated compounds are soluble in the vinyl acetate monomer whereby a solution of monomer containing chlorinated paraffin or fatty acid or fatty acid esters can be suspended in water with the aid of common surfactants and very high mechanical shear or ultrasound.

Chlorinated paraffins, fatty acids, and fatty acid esters can be used to effectively modify and sufficiently coalesce polyvinyl acetate polymers without the addition of coalescing solvents for good film formation. In addition, the chlorinated modifiers lower the Tg of the vinyl acetate polymeric binder thereby eliminating the need for expensive soft comonomers such as butyl acrylate. The chlorinated modifier can be dissolved in vinyl acetate monomer at weight levels of 1% to 90%, desirably between 3% and 50%, and preferably between 10% and 25% by weight chlorinated modifier based on the modifier and monomeric mixture. Preferably concentrated monomer mixtures are used as pre-emulsions while additional monomer is added during the monomer polymerization process to provide the desired level of chlorinated modifier in the overall finished polyvinyl acetate polymer. The organic mixture of chlorinated modifier and monomer can be suspended in an aqueous solution of surfactant, which may optionally contain buffer, stabilizers, and initiators. The aqueous suspensions can be formed by very high mechanical shear and/or ultrasound, forming organic phase particle droplets in water below about 5 microns, desirably below 1 micron, and preferably below 0.7 microns.

In accordance with this invention, the chlorinated modifier is dissolved in vinyl acetate monomer, subsequently suspended in water, followed by polymerization of the vinyl acetate monomers. Chlorinated modifier can be dissolved in vinyl acetate monomers and other ethylenic monomers if desired to form a fluid organic solution containing the desired amount of chlorinated modifier. This organic solution is then suspended in water with mixing to form a coarse suspension using the common latex surfactants as stabilizers, such as the sulfosuccinates, the sulfates, various ethoxylated phenols, and the like. The coarse suspension is then micronized to very fine particle size emulsion droplets of average size of less than 5 microns, preferably less than 1 micron, and preferably less than 0.7 micron. High mechanical shear and/or ultrasound can be used to form the sub-micron emulsion. Typical additional ingredients include buffers, and acrylic acid sodium salt of acrylamide methyl propane sulfonic acid (NaAMPS). Initiators such as persulfate, peroxide, and azo initiators can be added before or after suspension of the organic mixture in water. Redox initiators can be added if desired. Polymerization can be accomplished by simply raising the suspension temperature to about 70° C. to 80° C. using persulfate initiators. Initial reflux of vinyl acetate monomer will be at 67° C., but the temperature will rise with monomer polymerization conversion. Additional vinyl acetate can be added, preferably after the preformed suspended vinyl acetate emulsion monomer has polymerized.

Chlorinated hydrocarbon modifiers described above can be easily dissolved in vinyl acetate monomer to form a fluid organic solution above about 1% and desirably between 3% and 50% by weight and preferably 10% to 25% modifier based on the weight of the organic solution. The organic solution of chlorinated modifier and monomer can be suspended in a surfactant treated aqueous medium by high speed prop stirring to form a coarse suspension, followed by ultrasonification or very high shear to reduce the particle size of the organic phase to about 5 microns to produce a micronized suspension and preferably less than 1.0 micron. Suitable surfactants are used at about 0.1 to 5% by weight (based on solids) and include the nonionic surfactants such as various ethoxylated phenols, blocked copolymers of ethylene oxide and propylene oxide anionic surfactants such as sulfosuccinates, sulfates, and sulfonates, and the like (sulfosuccinates such as hexyl, octyl, and hexadecyl sulfosuccinate are preferred). Part of the vinyl acetate monomer can be polymerized followed by further polymerization of the remaining monomer if desired. Common initiators are used, such as the persulfates, at typical initiator levels and polymerization temperatures as previously described for emulsion polymerization.

In accordance with this invention, the vinyl acetate monomer is polymerized to produce a polymeric binder comprising emulsion polymerized vinyl acetate containing chlorinated hydrocarbon modifier. Selected amounts of other ethylenic monomers can be copolymerized with the vinyl acetate monomer to produce a copolymer containing by weight less than 60% and preferably less than 30% and most preferably between 0% and 20% other ethylenic monomer. Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl propionate, vinyl laurate, vinyl decanoate, vinyl butyrates, vinyl benzoates, vinyl isopropyl acetates and similar vinyl esters; vinyl aliphatic hydrocarbon monomers include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexane, cyclopentadiene, and dicyclopentadiene; and vinyl alkyl ethers include methyl vinyl ether, isopropyl vinyl ether, n-butyl vinyl ether, and isobutyl vinyl ether. Acrylic monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates, methacrylates as well as acrylic acids such as acrylic and methacrylic acid, ethacrylic acid, alpha-chloroacrylic acid, alpha-cycanoacrylic acid, crotonic acid, beta-acryloxy propionic acid, and beta-styrl acrylic acid. Particularly preferred comonomers include acrylates such as methyl, ethyl, propyl, butyl (linear and branched), 2-ethyl hexyl; methacrylates such as methyl, ethyl, propyl, butyl (linear and branched), 2-ethyl hexyl; vinyl esters such as acetate, proprionate, butyrate, pentanoate (neo 5), nonanoate (neo 9), 2-ethyl hexanoate, decanoate (neo 10); and other ethylenic monomers such as ethylene, vinyl chloride, vinylidene chloride and butadiene.

The emulsion polymerized vinyl acetate monomer produces a matrix polymeric binder of polymerized vinyl acetate monomer where the most preferred polymeric binders comprise homopolymers of vinyl acetate. On a weight basis, the polymeric binders comprise between 40% and 100% polymerized vinyl acetate with the balance being other ethylenic monomers. Preferred polymeric binders contain at least 70% by weight polymerized vinyl acetate and most preferred binders contain 80% to 100% copolymerized vinyl acetate. The number average molecular weight of the polymeric vinyl acetate binders should be between about 30,000 and 10,000,000 and preferably above 50,000 as measured by GPC (gel permeation chromatography) according to ASTM D3016-78, D3536-76, and D3593-80. The Tg or softening point of the chlorinated hydrocarbon modified polymeric binder particles should be less than 20° C as measured by differential scanning calorimetry, preferably less than 10° C., and most preferably less than 5° C. The MFT (minimum film formation temperature) is an alternative measure of polymer film formation determined on the neat latex on a temperature gradient temperature bar, and is typically a few degrees higher than the Tg of the latex. MFT should be less than 20° C., preferably less than 15° C., most preferably less than 10° C. The LTFF (low temperature film formation) is a film forming test run on the fully formulated paint. LTFF typically is reported as the lowest temperature at which no cracking is observed, or alternatively, the amount of coalescent needed to achieve 40° F. failure-free coatings. LTFF of this invention (including chlorinated modifier) should be less than 50° F. (10° C.), preferably less than 40° F. (5° C.). The distinction with LTFF is that other paint ingredients may have either an elevating influence (fillers, pigments) or depressing (surfactants, incidental solvents in additives) effect on LTFF relative to the MFT, which is measured on the latex alone. In turn, the MFT is measured from the wet state, and therefore includes the plasticizing effect of water, while the Tg is measured on an anhydrous sample of latex film, which does not include the water plasticizing effect. Latex paints are formulated to achieve LTFF of less than 50° F. (10° C.), and preferably less than 40° F. (5° C.). It is also necessary for the final dried films to not be tacky at normal use temperatures (60°-110° F.). The polymeric binder preferably contains between about 3% and 50% by weight softening chlorinated modifier with the balancing being vinyl acetate polymer or copolymer matrix polymer.

Historically, prior art paints achieved a balance of properties by making the latex slightly too hard for LTFF to achieve the tack-free character, and then temporarily softening the binder polymer with a coalescing solvent to achieve the desired LTFF. The coalescing solvent then evaporated from the film over a period of days, which allowed the restoration of tack-free character. If a binder copolymer containing an internal plasticizer is formulated to pass the LTFF test directly, the paint will be so tacky as to be unacceptable as a paint. However, by using non-volatile, external softening chlorinated modifier in accordance with this invention, the historical relationship between Tg (or MFT) and LTFF in the final paint can be changed such that both film formation and tack free character are simultaneously obtained without the need for a volatile coalescing solvent. The softening chlorinated modifier is permanent by design and will not volatilize out of the paint film.

In accordance with the process of this invention, the preformed softening chlorinated hydrocarbon modifier is dissolved in the vinyl acetate monomer to produce a compatible organic mixture of chlorinated modifier and monomer. The organic mixture may further contain a free radical initiator and is then suspended in water containing surfactant using high shear or ultrasound to produce an emulsified mixture of less than 5 microns and preferably less than 1 micron emulsion phase droplet comprising an organic phase dispersed into water. Thereafter the vinyl acetate monomer and other ethylenic monomer, if any, is polymerized in an aqueous polymerization medium by adding other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate. Redox systems consist of oxidants and reductants, which can be mixed in any pair. Transition metals such as iron can be used as accelerators for initiators for redox couples. The polymerization initiators are usually added in amounts between about 0.1 to 2 weight percent based on the monomer additions.

Suitable anionic surfactants include for example, salts of fatty acids such as sodium and potassium salts of stearic, palmetic, oleic, lauric, and tall oil acids, salts of sulfated fatty alcohols, salts of phosphoric acid esters of polyethylated long chain alcohols and phenols. Preferred anionic surfactants include for example, alkylbenzene sulfonate salts such as sodium dodecylbenzene sulfonate and salts of hexyl, octyl, and higher alkyl diesters of 2-sulfosuccinic acid. Suitable non-ionic surfactants include polyoxyethylene glycols reacted with a lyophilic compound, ethylene oxide condensation products reacted with t-octylphenol or nonylphenol and known as "Triton" surfactants, polymerized oxyethylene (IgepalCA), ethylene oxide reacted with organic acids (Emulfor), or organic acid reacted with polyoxyamylene ether of stearic or oleic acid esters (Tweens).

The preferred process involves pre-suspension by mechanical shear followed by high shear rotor-stator shear or ultrasonification to produce a micronized emulsion having droplets less than about 1 micron. Suitable surfactants include the various sulfosuccinates such as hexyl, octyl, and hexadecyl sulfosuccinate, the various alkyl and alkyl-aromatic sulfates and sulfonates, as well as the various nonionic ethylene oxide surfactants. The aqueous suspension can be generally formed at about 10% to 60% by weight total solids. The suspension can be heated to polymerize the vinyl acetate monomer while initiator is added if not already present in the pre-emulsion mixture. Suitable initiators include the common persulfates, peroxides, and hydroperoxides, along with redox initiator systems if desired. Additional vinyl acetate monomer can be added at any time during the polymerization to increase the particle size and raise the total solids of the system and help control the polymerization exotherm. The resulting polyvinyl acetate suspensions containing softening chlorinated modifier can be used directly in place of the common vinyl acetate copolymer latices in interior consumer air-dry paints.

A paint coating composition can be produced by combining the externally modified emulsion polymer of this invention with pigments and other paint additives in a dispersing mill such as a Cowles disperser. A pigment dispersion can be preformed consisting of a dispersant and pigments on a disperser mill, a sand mill, a pebble mill, a roller mill, a ball mill or similar conventional grinding mill for milling the mineral pigments into the dispersion medium. The premix can then be combined under low shear with the polymeric binder of this invention and other paint additives as desired. Useful mineral pigments ordinarily include opacifying pigments such as titanium dioxide, zinc oxide, titanium calcium, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower, barium sulfate, calcium carbonate and the like can be added.

The merits of this invention are further supported by the following illustrative examples.

EXAMPLES 1

Polymeric binders containing an chlorinated modifier was prepared as follows:

|   |   | Ex. 1 | Ex. 2 | Ex. 3 | Ex. 4 | Ex. 5 |
|---|---|-------|-------|-------|-------|-------|
| a) | Deionized water | 800 | 800 | 800 | 800 | 2000 |
|    | MM-80, Mona Chem.[1] | 6.0 | 6.0 | 6.0 | 6.0 | 15 |
|    | NaHCO3 | 1.0 | 1.0 | 1.0 | 1.0 | 2.5 |
|    | NaAMPS Lubrizol[2] | 1.0 | 1.0 | 1.0 | 1.0 | 2.5 |
| b) | Vinyl acetate monomer | 250 | 250 | 250 | 250 | 625 |
|    | DA-8527, Dover[3] | — | 100 | — | — | 250 |
|    | DA-8506, Dover[4] | 100 | — | — | — | — |
|    | Paroil 10 Dover[5] | — | — | 100 | — | — |
|    | Paroil 170-LV Dover[6] | — | — | — | 100 | — |
|    | MT-70, Mona Chem.[7] | 3.0 | 3.0 | 3.0 | 3.0 | 7.5 |
| c) | K2S2O8 | 2.0 | 2.0 | 2.0 | 2.0 | 5.0 |
| d) | vinyl acetate monomer | 250 | 250 | 250 | 250 | 625 |
|    | MT-70 | 3.0 | 3.0 | 3.0 | 3.0 | 7.5 |

[1]MM-80 is sodium dihexyl sulfosuccinate.
[2]NaAMPS is sodium acrylamide methyl propane sulfonate.
[3]DA-8527 is a chlorinated fatty acid with 29% chlorine.
[4]DA-8506 is a chlorinated fatty acid ester, with 35% chlorine.
[5]Paroil 10 is a chlorinated parafin with 41% chlorine.
[6]Paroil 170-LV is a chlorinated parafin with 67% chlorine.
[7]MT-70 is sodium tridecyl sulfosuccinate.

Solution (b) was prepared and dispersed into solution (a) at 5,000 rpm with a lab 1.5 inch prop stirrer. The resulting organic mixture was passed through a Sonics Corp. VA-600 ultrasonics unit equipped with a flow through cell, one pass at 85% power to produce an organic phase dispersed in water. Component (c) was added, heated to 65° C. and held 1.5 hours. Monomers (d) were fed in over three hours at 72° C., held 1 hour, and then the reaction mixture was cooled to room temperature.

Clear films were air dried at room temperature for 24 hours. Dried film properties were as set forth in following Table 1:

TABLE 1

| Example | MFT Crack | MFT Knife | Water Rubs | Water Whitening | Tack |
|---------|-----------|-----------|------------|-----------------|------|
| 1 | 9 C | 18 C | 200+ | Moderate | None |
| 2 | <2 C | 10 C | 200+ | Moderate | v. sl. |
| 3 | <3 C | 9 C | 200+ | Moderate | None |
| 4 | 12 C | 26 C | 200+ | Moderate | None |
| 5 | 3 C | 14 C | 200+ | Mild | None |

EXAMPLE 2

Semi-gloss interior wall paint was made from the chlorinated modified polymeric binder of Example 1 as follows:

Pigment Grind:

| Group | Ingredient | Grams |
|-------|------------|-------|
| A | Water | 151.68 |
| A | Thickener | .50 |
| A | Ammonia (28%) | .01 |
| B | Surfactant | 5.00 |
| C | Defoamer | 2.00 |
| C | Surfactant | 2.00 |
| D | TiO2 pigment | 145.00 |
| D | Clay extender pigmt. | 50.00 |

Group A ingredients were added to Cowles dispersing equipment and mixed for 5 minutes. Group B and then C ingredients were added with continued mixing under slow agitation. Group D ingredients were added under high speed agitation and grind for 15 minutes or until a Hegman 5.5 was attained. The foregoing is the grind portion of the paint.

| Letdown | Ingredient | Grams |
|---------|------------|-------|
| E | Water | 33.00 |
| F | Water | 33.00 |
| F | Thickener | 3.50 |
| F | Ammonia Hydroxide | .01 |
| G | Preservative | 1.00 |
| H | Defoamer | 5.00 |
| H | Propylene glycol | 40.00 |
| H | Surfactant | 4.50 |
| H | Rheology Modifier | 9.00 |
| H | Surfactant | 3.00 |
| I | Latex | 393.00 |
| I | Opacifier | 105.00 |

Group E ingredients were added in separate vessel, followed by Premix F ingredients added to E ingredients with slow speed agitation. Group G ingredients were added at slow speed. Premix H ingredients were than added to the mixing vessel. Premix I ingredients were mixed for 30 minutes and then added to vessel. The final composition was mixed for 1 hour. The foregoing is the letdown portion of the paint.

Latex Paint

The letdown above was added to the pigment grind above under slow speed agitation and allowed to mix for 2 hours to form a latex paint.

Characteristics of paint films dried at ambient temperature for 24 hours based on the foregoing latex paint formulation were as follows:

| Low temperature film formation | pass |
| --- | --- |
| Surface tack | nil |

EXAMPLE 7

Chlorinated paraffins and fatty acids were found to function well as effective Tg lowering modifying agents for poly(vinyl acetate) polymer latex paints in the same manner as Example 6. Suspension polymers of the chlorinated materials with the polymerized polyvinyl acetate form clear films at room temperature and provide good consumer architectural paints. No comonomer is needed with vinyl acetate (VAc) and organic solvent coalescing aid is not required for good air dry film formation. Hence, the paints lack the odor normally caused by the coalescing solvent.

We claim:

1. An aqueous ambient dry paint coating composition containing a polymerized polymeric binder free of organic coalescing solvent and other volatile organic compounds, the polymeric binder comprising:

a vinyl acetate polymer comprising polymerized vinyl acetate monomer containing chlorinated modifier selected from a chlorinated paraffin, a chlorinated fatty acid, or a chlorinated fatty acid ester, where the chlorinated modifier has a number average molecular weight between about 150 and 5,000 and a Tg below about −20° C., the polymeric binder containing at least 1% by weight of said chlorinated modifier, where said polymeric binder is produced by mixing the chlorinated modifier in the vinyl acetate monomer to provide an organic mixture of chlorinated modifier and vinyl acetate monomer, where said organic mixture is polymerized in water to produce chlorinated modified vinyl acetate emulsion polymer and provide a polymeric binder having a Tg less than 20° C.

2. The paint coating of claim 1 where the polymeric binder contains between 3% and 50% of said chlorinated modifier.

3. The paint coating of claim 1 where the polymeric binder contains between 10% and 25% of said chlorinated modifier.

4. The paint coating of claim 1 where the chlorinated modifier has a number average molecular weight between about 300 and 1,000.

5. The paint coating of claim 1 where the chlorinated modifier has a Tg less than about −40° C.

6. The paint coating of claim 1 where the chlorinated modifier has a Tg less than about −50° C.

7. The paint coating of claim 1 where the polymeric binder is produced by dispersing the organic mixture of chlorinated modifier and vinyl acetate monomer in water to produce an aqueous dispersion micronizing the aqueous dispersion with high shear to a micronized aqueous dispersion having organic phase particle size droplets less than 5 microns and polymerizing the vinyl acetate monomer to produce a polymeric binder having a Tg less than 20° C. comprising an emulsion vinyl acetate polymer containing said chlorinated modifier.

8. The paint coating of claim 7 where the organic phase particle size droplets are less than 1 micron.

9. The paint coating of claim 7 where the organic phase particle size droplets are less than 0.7 microns.

10. The paint coating of claim 1 where the vinyl acetate monomer is mixed with other ethylenically unsaturated monomer to produce a monomer mixture, and the monomer mixture is copolymerized to produce a chlorinated modified vinyl acetate emulsion copolymer.

11. The paint coating of claim 10 where the copolymerized monomer mixture comprises between 100% and 80% by weight vinyl acetate monomer.

12. The paint coating of claim 10 where the copolymerized monomer mixture comprises between 100% and 70% by weight vinyl acetate monomer.

13. The paint coating of claim 10 where the copolymerized monomer mixture comprises between 100% and 60% by weight vinyl acetate monomer.

14. The paint coating of claim 1 where the chlorinated modifier is a chlorinated paraffin.

15. The paint coating of claim 14 where the chlorinated modifier is a chlorinated fatty acid.

16. The paint coating of claim 14 where the chlorinated modifier is a chlorinated fatty acid ester.

* * * * *